United States Patent [19]

Peil et al.

[11] Patent Number: 4,870,421
[45] Date of Patent: Sep. 26, 1989

[54] REGULATING SWITCH FOR TRANSMITTING MODULES IN A PHASED ARRAY RADAR

[75] Inventors: William Peil, North Syracuse; Donald W. Perkins, Dewitt, both of N.Y.

[73] Assignee: General Electric Company, Syracuse, N.Y.

[21] Appl. No.: 138,795

[22] Filed: Dec. 28, 1987

[51] Int. Cl.[4] .......................................... G01S 13/00
[52] U.S. Cl. .................................. 342/175; 333/136; 342/374
[58] Field of Search ............... 342/175, 368, 369, 371, 342/372, 374, 157; 333/253, 254, 260, 124, 136, 32, 17 M, 34, 21 A, 125

[56] References Cited

U.S. PATENT DOCUMENTS

| | | | |
|---|---|---|---|
| 3,953,853 | 4/1976 | Carter et al. | 342/374 |
| 4,124,852 | 11/1978 | Steudel | 342/374 |
| 4,251,817 | 2/1981 | Kimura et al. | 342/175 |
| 4,259,743 | 3/1981 | Kaneko et al. | 342/175 X |
| 4,433,313 | 2/1984 | Saint et al. | 333/109 |
| 4,583,096 | 4/1984 | Bellman et al. | 342/368 |
| 4,682,176 | 7/1987 | Jones | 342/175 |

Primary Examiner—Thomas H. Tarcza
Assistant Examiner—John B. Sotomayor
Attorney, Agent, or Firm—Richard V. Lang; Carl W. Baker; Fred Jacob

[57] ABSTRACT

The invention relates to compact means for turning power on and off and regulating that power as it is supplied to a pulsed transmitting module in a phased array radar system. The arrangement comprises an operational amplifier, which compares the voltage across the module with a gated programmable digital voltage reference, and a high bandwidth power transistor serially connected with the load, the conductivity of which is controlled to adjust the load voltage to the reference value. Capacitive coupling prevents burnout of the transmitting module from a sustained "on" signal and a capacitive feedback connection at the operational amplifier limits the rise time of the voltage supplied to the load to avoid ringing. The use of a "switch" in a regulating mode reduces the amount of local storage capacity required to achieve comparable regulation, and leads to a power conditioner for an individual transmitting module, which is both compact and of high performance. The programmable nature of the voltage reference allows for convenient "tapering" of the power supplied from each module to the associated antenna element.

7 Claims, 5 Drawing Sheets

FIG. 4 T/R SUBASSEMBLY

FIG. 6

REGULATING SWITCH FOR TRANSMITTING MODULES IN A PHASED ARRAY RADAR

BACKGROUND OF THE INVENTION

1. Field of the Invention

The invention relates to means for turning power on and off to a pulsed transmitting module in an array of similar modules used to drive the elements of a phased array radar anenna, and more particularly to a novel means of turning the module on to a precise digitally controlled power level, and then sustaining the power level throughout the pulse.

2. Prior Art

In a conventional phased array radar system, a low power exciter generates the carrier of the transmitted radar signal. The exciter output is modulated in amplitude and/or phase to generate radar pulses of low power. These low power pulses are then distributed in controlled amplitude and phase to an array of power amplifying modules each arranged to drive an antenna element of the phased array. In order to conserve energy, the power amplifying modules are turned on a moment before the modulated exciter pulse begins and are turned off a moment after the modulated exciter pulse ends. The reason for applying power to the modules only for the duration of the exciter pulse is to minimize heating of the power modules for a given peak power, and thereby maximize the peak power.

In a conventional power supply for a radar transmitter, the power supply is designed to handle the average power consumed by the transmitter during intermittent operation with reliance being placed on energy storage in large capacitors to sustain the voltage on the transmitter when a high peak power is required of the supply during the pulse.

The supply voltage can be better sustained with additional energy storage, but only at the cost of added bulk. The term "capacitor droop" has been applied to the effect on the transmitted pulse of a falling supply voltage at the transmitter or power amplifier. Capacitor droop is present to some degree in most radar transmissions. If a single transmitter or power amplifier feeds all the antenna elements, the droop is simultaneous on all antenna elements and the adverse effect on the beam is small. However, when each antenna element has one or a plurality of power amplifiers, and the power amplifiers have potentially different power supplies, then the problem becomes severe. Here the reactive energy storage properties of the supplies must remain matched or the "droop" will not be simultaneous at all elements in the array and the beam will be distorted and pulse-to-pulse correlation severely reduced.

A further common requirement of a power amplifier for the antenna element in a phased array radar is that it be capable of plural outputs to achieve tapering of the r.f. output depending on the position of the element in the array. Tapering may be achieved by adjustment of the supply voltage at each power amplifier. It is therefore desirable that the output of a power supply be conveniently adjustable or programmable.

The transmitting power modules of current design employ solid state components in the power modules driving the antenna elements. Metal Oxide Semi-conductor Field Effect Transistors (MOSFETs) or High Electron Mobility Transistors (HEMT) are commonly used in this application, and such devices are often fabricated on a Gallium Arsenide substrate. At frequencies in excess of 1 GHZ, a Monolithic Microwave Integrated Circuit (MMIC) format, which combines passive circuit features with the active devices on a Gallium Arsenide substrate is common. These circuits are particularly compact.

In the conventional power conditioner for transmitting power modules, a common element is the switch, which turns the power on and off (hence the term "drain switch" by virtue of its connection to the drain electrode of a field effect transistor), accompanied by local inductors or capacitors to sustain the dc when peak power is required. With the advent of higher frequency operation and MMIC fabrication techniques, the MMIC r.f. circuits in the transmitting modules tend to be dwarfed by their associated power supply components. In such applications, it is particularly desirable that the module power conditioner be of minimum bulk.

SUMMARY OF THE INVENTION

Accordingly, it is an object of the invention to provide an improved power switch for transmitting modules in a phased array radar system.

It is another object of the invention to provide an improved power switch having a regulating feature for transmitting modules in a phased array radar system.

It is still another object of the invention to provide improved power regulation means for a pulsed transmitting module in a phased array radar system.

It is an additional object of the invention to provide a compact regulating switch suitable for operating a transmitting MMIC module in a phased array radar system which employs large numbers of similar modules.

It is a further object of the invention to provide a compact switch and regulator for operating a pulsed transmitting MMIC module in a phased array radar system which employs large numbers of similar modules, in which the voltage output may be independently programmed for beam tapering or other purposes.

These and other objects of the invention are achieved in a novel digitally programmable regulating drain switch which couples power from a dc power supply to a pulsed transmitting MMIC module designed to drive an individual antenna element in a phased array radar system.

The regulating switch, which includes associated filtering capacity, is serially connected with the load presented by the r.f. circuits of the pulsed power module to a remote dc supply.

The regulating switch additionally comprises a gated digitally programmable voltage reference of high temperature stability and a high gain operational amplifier having its positive input terminal connected to the gated voltage reference and its negative terminal coupled through a voltage divider to sense the voltage at the load. The output of the operational amplifier is capacitively coupled to a gate of the power metal oxide semiconductor field effect transistor (MOSFET) providing the power switching function, and means are provided for discharging the coupling capacitor at a desired rate.

The transistor switch provides a smoothly variable conductivity, as required to provide regulating switching action. The transistor thus must have a very low Rds(on) for efficiency, and a bandwidth comparable to that of the pulses being transmitted, typically in excess of one megaHertz to provide a sufficiently rapid response to changes occurring at the pulse rate. The capacitive coupling circuit protects the MMIC module from sustained operation that would overheat the module and permits use of the more reliable N-channel type with the given positive dc supply potential. A feedback capacitor is also provided to limit the rise time applied to the load to the maximum consistent with accuracy in the regulation while avoiding ringing in the load.

The programming feature allows the power setting on any module to be independent of any other, and adjusted to the desired value for calibration and/or "tapering".

The consolidation of switching and regulating features into a single device requires no more dissipation than a non-regulating switch, and the regulation feature reduces the size required for the local capacitor, had local regulation not been available. The result is a compact high performance power conditioner performing both switching and regulating functions and eliminating "capacitor droop".

BRIEF DESCRIPTION OF THE DRAWINGS

The inventive and distinctive features of the invention are set forth in the claims of the present application. The invention itself, however, together with further objects and advantages thereof may best be understood by reference to the following description and accompanying drawings, in which:

DESCRIPTION OF THE PREFERRED EMBODIMENT

Figure 1:
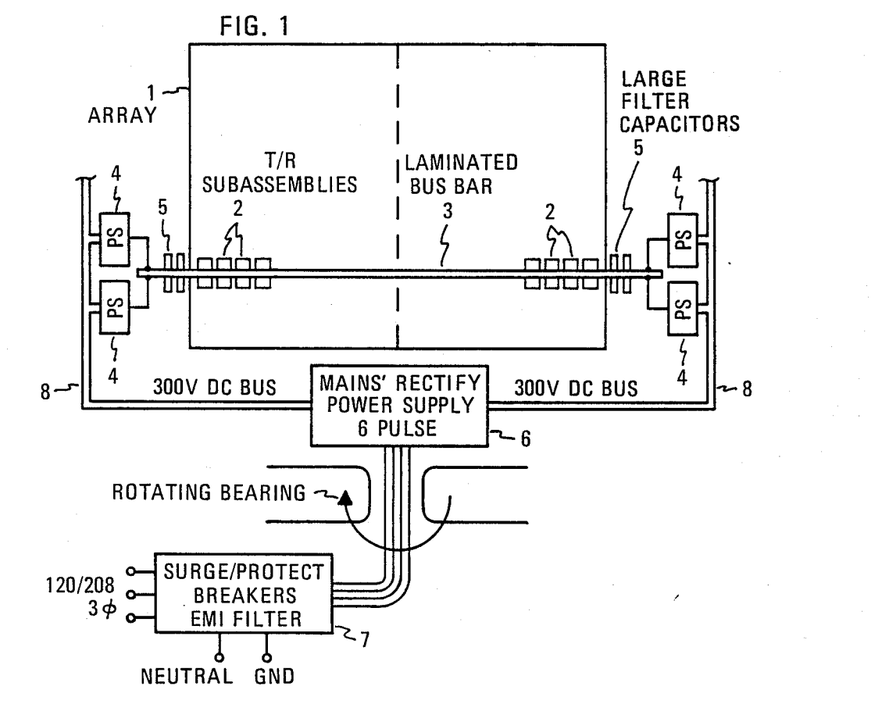
FIG. 1 is a schematic illustration of the back of a phased array radar system showing an arrangement of an array of T/R sub-assemblies, each of which operates four rows of T/R elements within the array, and the means for supplying power to the sub-assemblies.

FIG. 1 is an illustration of the back of the antenna array 1 of a phased array radar system, showing the placement of one row of transmit/receive subassemblies (2), each connected to a set of four antenna elements, and the means (4-8) for supplying power to the T/R sub-assemblies.

The illustrated array employs 3584 antenna elements, 64 antenna elements per horizontal row and 56 antenna elements per vertical column. Since each sub-assembly operates a "set" of four antenna elements in the same vertical column, fourteen rows of antenna connected sub-assemblies are required per column and 64 sub-assemblies are required per row. The array thus requires a total of 896 sub-assemblies to operate 3584 antenna elements.

The source of power for each row of sub-assemblies is four 1 KW power supplies (4) and eight large filter capacitors (5) disposed at the sides of the array (1). Power is supplied from the power supplies (4) and large filter capacitors (5) to the sub-assemblies (2) by means of a laminated multi-conductor bus bar (3). The laminated bus bar (3) has the properties required for efficient transmission of power of typical radar pulse duration to four rows of MMIC transmitting modules, each row containing 64 radiating elements.

Figure 2:
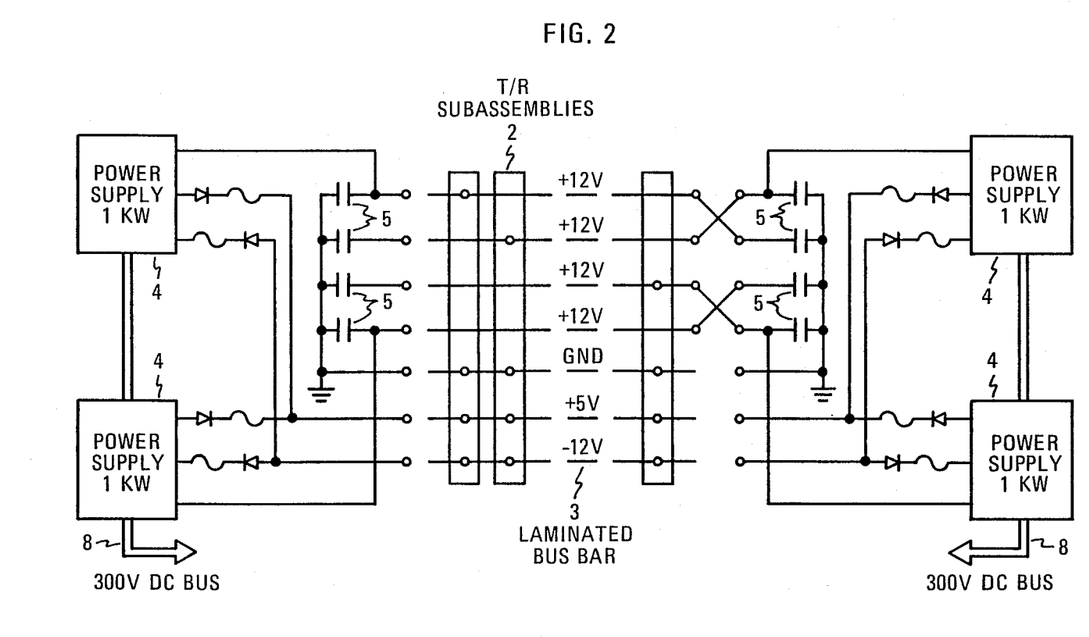
FIG. 2 is a more detailed illustration of the dc power supplies, providing power to one row of T/R sub-assemblies.

The disposition of the 1 KW power supplies (4), large filter capacitors (5), and the T/R sub-assemblies (2) and their connections to the bus bar (3) are illustrated in FIGS. 1 and 2. Four large (100,000 uF, 16 volt) filter capacitors (5), are disposed at the right end of the bus bar and four like capacitors are disposed at the left end of the bus bar. Similarily two 1 KW power supplies (4) are disposed at the right end of the bus bar and two 1 KW power supplied (4) are disposed at the left end of the bus bar. Altogether 112 such capacitors and 56 such power supplies are required for the exemplary 3584 element array.

Each power supply (4) supplies one kilowatt of power at +12 volts to 16 of the T/R sub-assemblies in a row of 64 T/R sub-assemblies. The +12 volt conductors of the bus bar are used to supply the large amounts of power required by the power amplifiers during pulse transmission. The +5 volt conductor of the bus bar is used to provide the lower amounts of power required by the receiver's low noise amplifiers and the −12 volt conductor of the bus bar is used to provide the bias, also at very low power. These latter low power voltages are netted for reliability.

Figure 3A:
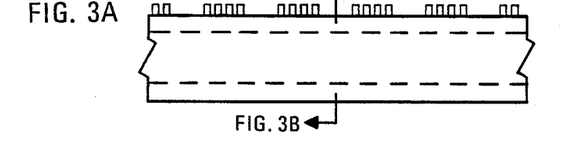
FIGS. 3A, 3B and 3C are illustrations of the construction of a multi-conductor bus bar used to supply power from the power supplies to the T/R sub-assemblies.
Figure 3B:
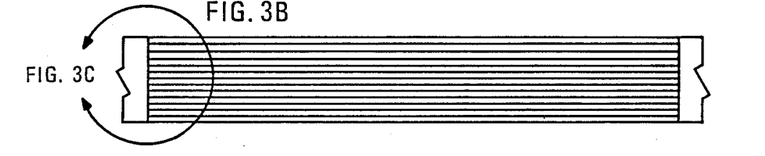
Figure 3C:
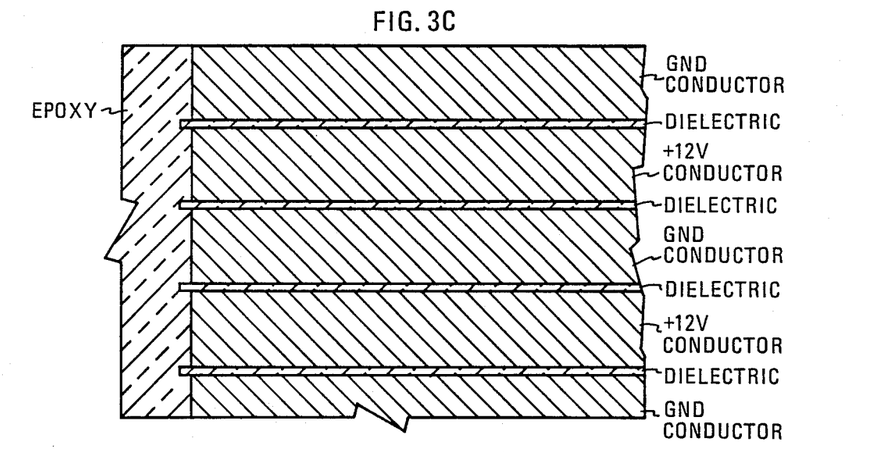

The bus bar (3), which is symbolically illustrated in FIG. 2, and physically illustrated in FIGS. 3A-3C is a multi-layer laminate along which connectors are placed at 64 locations. The 64 T/R sub-assemblies in one row are pseudo-randomly connected to each of the 1 KW power supplies (4) such that each supply drives sixteen T/R sub-assemblies. This mode of connection is made so that failure of one of four supplies would provide a minimum disruption of transmitter performance and the netting applicable to the +5 and −12 volt supplies virtually assures no disruption of receiver performance.

The structure of the laminated bus bar applicable to the power supply system is illustrated in FIGS. 2 and 3A-3C. It consists of six power transmission paths providing respectively four transmission paths for +12 volts (for transmitting power), another for +5 volts (for receiver power), and another for −12 volts (for low power biasing) with interspersed grounds. Each power transmission path consists of a conductive copper layer approximately 0.020" in thickness by 2" in width with a dielectric layer two to three thousandths inches thick separating the principal conductor from a pair of ground planes, also of 0.020" copper disposed to either side of the principal conductor. The taps to the individual sub-assemblies are taken from the back edges of the strip conductors by an ultrasonic bond. As implied in FIG. 1, the taps occur at 64 intervals corresponding to the positions of the T/R sub-assemblies between the ends of the bus bar. The tap construction is indicated more particularly in FIG. 3B.

The power supplies (4) are netted, as suggested earlier, so that the receiving and negative bias function will not be impaired by failure of less than all four power supplies (4) feeding the same row. As shown in FIG. 2, each +5 volt supply and each −12 volt supply is coupled via a fuse and a suitably poled protective diode to the +5 and the −12 volt bus conductors. In the event of failure of a supply (4), the remaining supplies are connected to provide energy to the bus conductor and the failed supply is isolated by the diode. Meanwhile the net is further protected against diode failure by a fuse.

The 1 KW power supplies (4), whose load connections to the T/R sub-assemblies are also shown in FIG. 2, are in turn supplied power by a 300 volt dc bus (8) connected to a six pulse 56 KW ac main supply (6), shown in FIG. 1. A protective circuit (7) is provided which delivers three phase power to the mains supply (6) after it has been conditioned by EMI filtering, primary circuit breakers, and line surge protection.

The bus bar (3), 1 KW power supplies (4), large capacitors (5), 300 volt buses (8), mains/rectify supply (6), and protective circuit (7) are designed to provide the required power for operation of the pulsed T/R assemblies in all (transmit, receive and calibrate) modes of operation. The members of the power distribution system must provide both the required average power and the substantially higher peak powers which are required during pulsed transmission to T/R sub-assemblies. The power distribution system, to avoid significant droop in voltage supplied to the transmitter electronics during transmission of a single pulse, or carry over from previous pulses, must be designed so that, at the individual T/R sub-assemblies any droop is held to a tolerable minimum. This permits precise regulation as will be explained later. This tolerable minimum is set by the head room required for operation of the regulator placed within the individual T/R sub-assemblies plus the voltage required at the transmitting module forming the ultimate load.

Recapitulating, the power distribution system provides four kilowatts of power to the 64 T/R subassemblies distributed along each bus bar, and 56 kilowatts of power to all 14 buses feeding the full array. Power for transmitter operation is supplied to the +12 volt conductors of the bus bar by the four 1 KW power supplies (4) and the eight 100,000 microfarad 16 volt capacitors, placed at the ends of the +12 volt conductors of the bus bar (3). The one kilowatt supplies (4) provide a continuous supply of energy to the large storage capacitors (5) connected to the bus bar conductors (3). The pulsed loads presented by the individual T/R sub-assemblies require energy simultaneously during pulses of variable duration. The durations are roughly between a microsecond and milliseconds. The pulsed loads thus withdraw power from the capacitors (5) and from the sources (4) via the bus bars at higher peak powers than the average power. This tends to cause a voltage reduction at the loads in the course of a single pulse or, from pulse-to-pulse. Were measures not taken to support a constant voltage at the individual T/R sub-assemblies, transmitter operation would be compromised.

Compromised operation in accordance with the invention is avoided by the provision of substantial energy storage at the ends of the bus bar, as already noted, critical design of the bus bar to reduce the voltage drop to tolerably small limits as the pulse progresses or repeats, and by the use of additional capacitance and voltage regulation within each of the T/R sub-assembly loads.

Figure 4:
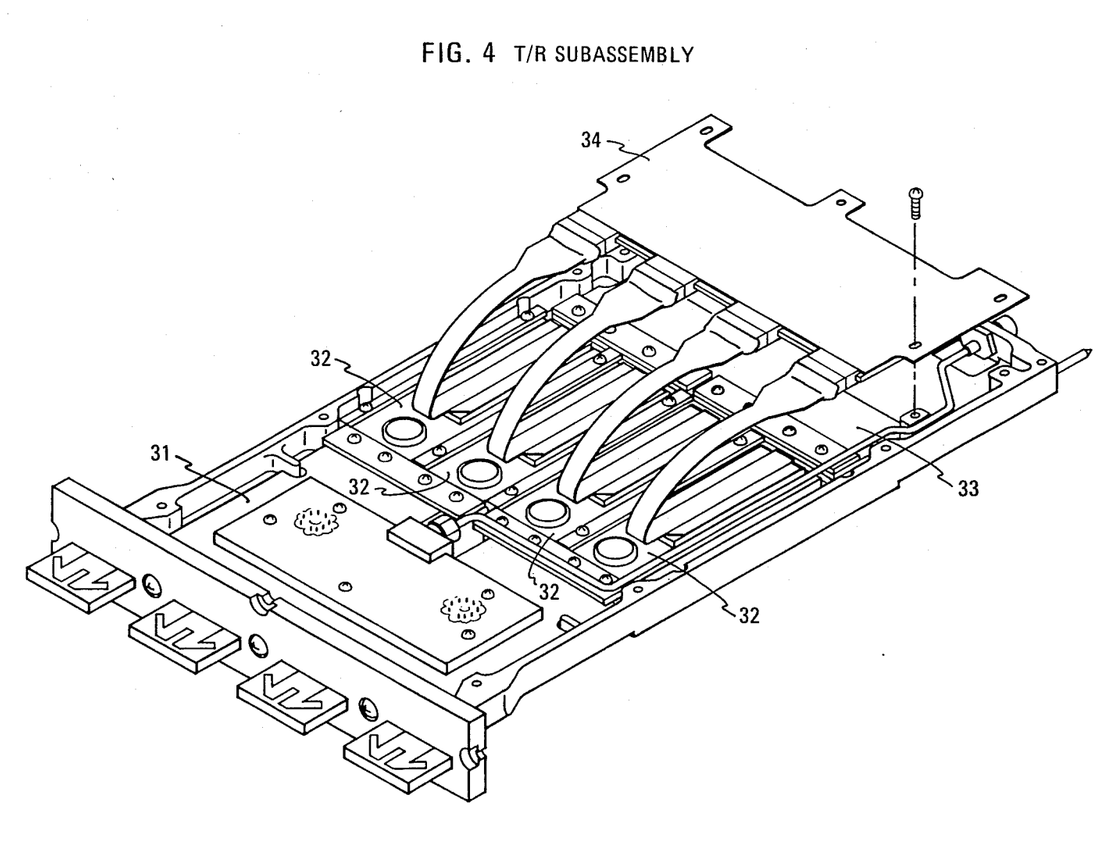
FIG. 4 is an illustration of one T/R sub-assembly, containing four T/R modules used to operate four antenna elements and containing filter capacitors and four novel module regulating drain switches which further condition the dc power supplied to the T/R modules.

FIG. 4 shows a T/R sub-assembly which as one of 896 like T/R sub-assemblies forms an ultimate load of the power supply system. The T/R sub-assembly may be regarded as divided into four parts consisting of an antenna distribution circuit 31, a beam former distribution circuit 33, a phase shifter and T/R circuit or module 32, and a power and control block assembled on the substrate 34.

The antenna distribution circuit 31 has three functions. In transmission, it couples the outputs of four pulsed high power amplifiers on an individual basis to each of four antenna elements. In reception, the antenna distribution network delivers the signal returns from four dipole elements on an individual basis to each of four low noise amplifiers. During monitoring of the state of the circuits in the sub-assembly, particularly the phase shifter, couplers are provided to check the phase of the signal at each antenna element for calibration purposes. The antenna distribution circuit 31 is passive, and is most conveniently carried out using stripline transmission lines, which provides good shielding between circuits in the chassis, at low cost, and with the necessary compactness. It dissipates negligible power in the T/R sub-assembly.

The beamformer distribution circuit 33 distributes a signal multiplexed from four separate receiving antennas to a single channel leading to the beamformer during reception, and similarly couples signals from the beamformer intended to operate with four antenna elements. The beamformer distribution circuit has no active elements, and is preferably carried out using stripline transmission lines. It, likewise dissipates negligible power in the T/R sub-assembly.

The phase shifter and T/R circuit or "module" 32 is connected between the antenna distribution circuit and the beamformer distribution circuit. It requires both active and passive elements. While it may eventually be formed on a single monolithic Gallium Arsenide substrate, present economics dictate a hybrid construction of the module. Microstrip construction is presently the only practical approach.

The modules each contain the receiving and transmitting electronics associated with one antenna element. The receiving electronics typically includes low noise amplifiers and a variable gain amplifier. The transmitting electronics likewise associated with one antenna element, typically includes a driver amplifier, and a power amplifier, often subject to gain control. As earlier noted, the electronics requires −12, +5 and +12 volt dc supplies, the last of which provides the principal power for pulse transmission.

The T/R sub-assembly includes the control logic for operating the phase shifter and determining the transmit/receive calibrate states and further includes local power conditioning which includes additional capacitors and a switching voltage regulator. The power conditioning and control circuitry dissipate measurable amounts of electrical power.

The T/R sub-assembly thus contains the electronic circuits, used to operate four elements of a phased array in a radar system operating from 5 to 6 GHz and the local capacitors and voltage regulators which are the last elements in the power distribution system. Each T/R sub-assembly, the ultimate load and the recipient of the power distributed from the bus, is designed to radiate up to 40 watts of r.f. power while dissipating 200 watts of heat. Accordingly, the sub-assembly chassis must be large enough to contain the active electronics and the local capacitors and regulators and small enough to permit the necessary air passages required to carry off the heat generated.

In the phased array radar system under consideration, each T/R sub-assembly is required to stay within the cross-sectional area requirements of the associated antenna elements. A set of four antenna elements has proven to be the most satisfactory grouping. The antenna elements are spaced from about one-half to two-thirds wavelengths apart, depending upon the scanning range. In the present arrangement a relatively low vertical scanning range is contemplated allowing the vertical spacing of the antenna elements to be about two-thirds of a wavelength. With a larger horizontal scanning range, the horizontal spacing between dipole elements is about one-half wavelength. Under these circumstances the antenna elements, if dipoles, will be oriented in a vertical plane, since there is greater available space in the vertical direction, and air spaces between sub-assemblies will be provided parallel to the vertical columns.

The demand that the cross-sectional area of the antenna operating circuitry not exceed the area dimensions of the array, forces the cross-sectional area of each sub-assembly chassis containing the antenna operating circuits to stay within the one-half to two-thirds wavelength dimensions allowed per antenna element. This spacial restriction allows all r.f. paths at the T/R sub-assemblies to be of equal length and the sub-assemblies to be interchanged.

In the example at hand, the electronic circuits of a T/R sub-assembly for operating four antenna elements, fall within an overall cross-sectional dimension of 16 cm × 2.7 cm, or 4 cm × 2.7 cm per antenna element. This cross-section is compact enough for an array operating at 5 to 6 GHz.

The control circuits implement high level beam steering commands from a remote control computer, compute low level beam steering commands and perform the self calibration function. In the self calibration function, phase errors in the individual modules are periodically measured and corrected for essentially all errors, including fixed voltage errors but not voltage drift attributable to the power supply system.

Figure 5:
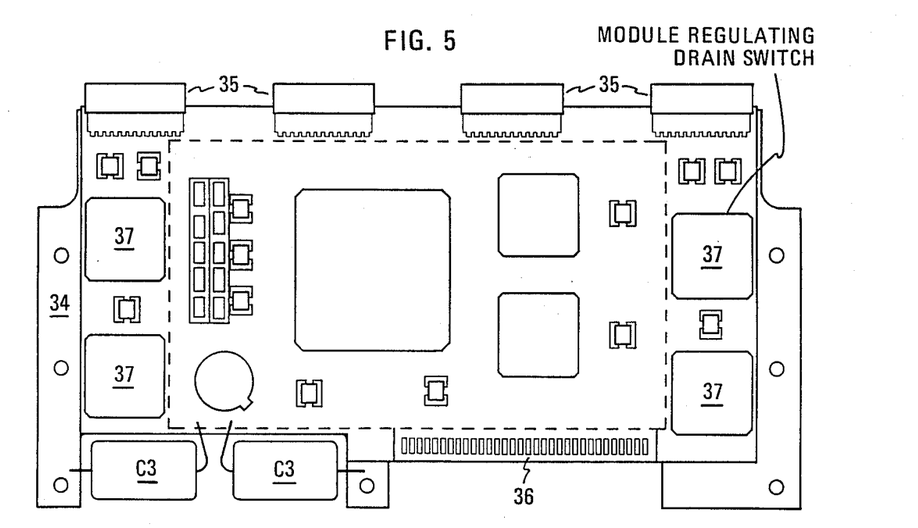
FIG. 5 is a plan view of the substrate upon which the control unit, filter capacitors and the regulating drain switches for four modules within one T/R subassembly are mounted.

The local power conditioning circuits, referring to FIG. 5, include four regulating drain switches (37) each assigned to one module. Two local filter capacitors (C3) are shared between the four regulating drain switches. The four "regulating drain switches" (37) are mounted on a small aluminum substrate (34). The local power conditioning provides the required regulation to stabilize the local transmission loads to better than one millivolt during a pulse or from pulse-to-pulse in transmitter operation.

The aluminum substrate (34), upon which the control circuits and the local power conditioners are mounted, is provided with a row of four sockets (35) for connection to connectors leading to the individual T/R modules (32). These connectors provide local steering commands, timing controls and power to the T/R modules. The same signals, except for the steering commands, which are at a higher level, are supplied to the T/R sub-assembly by thirty-one pads (36), mounted on an auxiliary circuit board attached to the substrate (34). The pads (36) are designed to be connected to a connector, not illustrated, but designed for a socket supported on the laminated bus bar (3).

The four module regulating drain switches (37) are placed at the two ends of the substrate (34), and the shared filter capacitors C3, which are typically of 100 microfarads, twenty volt ratings, are placed at the back edge of the substrate adjacent to the thirty-one pads (36). The module regulating drain switches (not including the capacitors C3) are placed within small square hermetic packages approximately one-half inch on an edge on the aluminum substrate (37). The aluminum substrate is approximately $4\frac{3}{4}$ inches × $2\frac{1}{2}$ inches.

The novel regulating drain switches (37), during radar pulse transmission, are designed to turn on and turn off the MMIC power amplifiers within short intervals and to do so to a precise digitally controlled power level. The regulating feature of the drain switch is designed to operate at a rate comparable to the rise times and fall times of the transmitted radar pulses, and to sustain any variation occuring during the pulses. For this purpose, the gain bandwidth of the drain switch is set between one and 10 megaHertz. The upper limit to the gain bandwidth, as will be explained, is normally set low enough to avoid ringing in the module loads.

Since the novel regulating drain switches have mega-Hertz gain bandwidths, they are capable of providing substantially instantaneous corrections for the real time changes in load or in the supply present during pulsed radar transmissions and are able to maintain the 10-12 volt dc supply outputs with millivolt accuracies at the individual T/R modules. The outputs of each of the several thousand power amplifiers in a single radar system are thereby stabilized against load or power supply induced change in pulse amplitude thus permitting the maximum possible pulse-to-pulse correlation to exist.

In addition to the foregoing, the novel regulating drain switches provide means to prevent destruction of the MMICs within the T/R module in the event of hardware or software failure.

Figure 6:
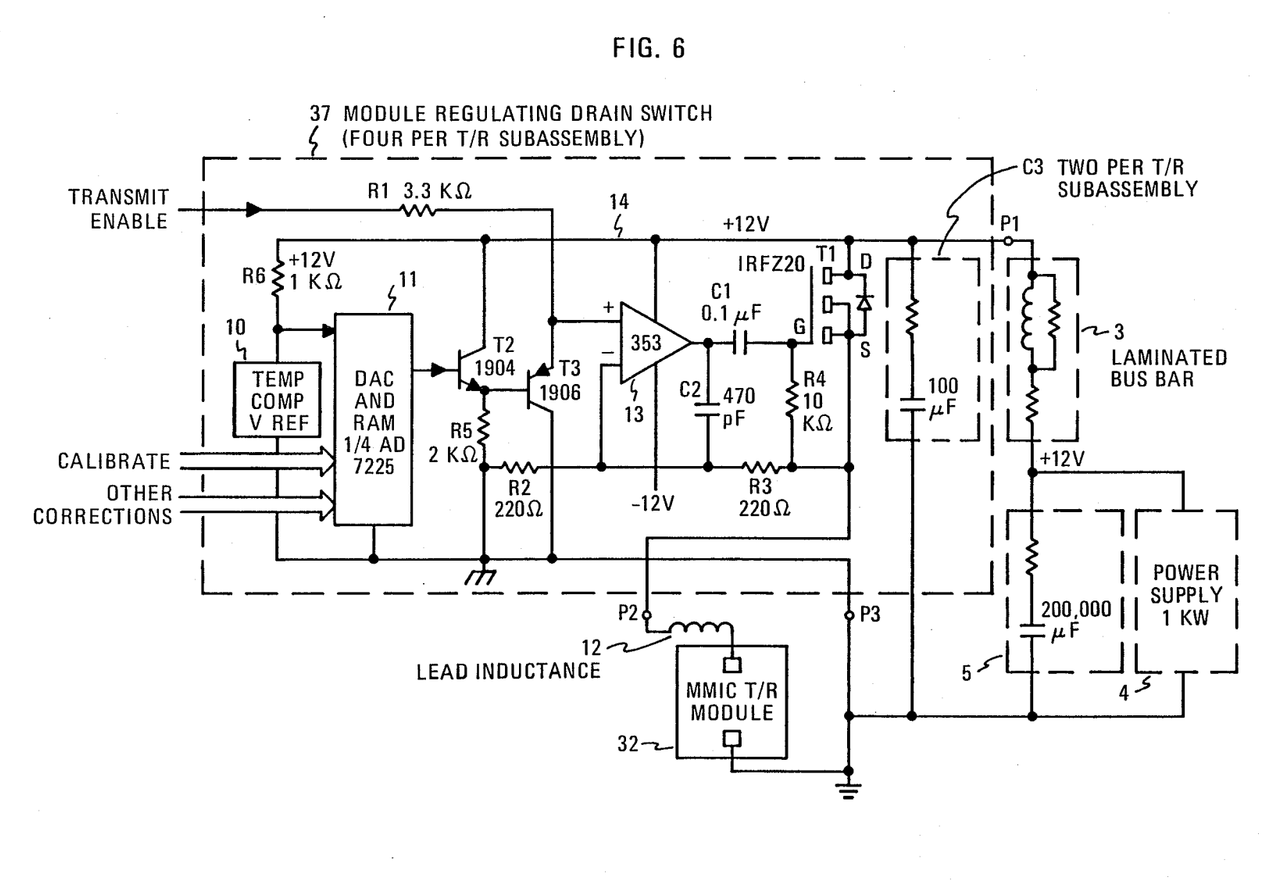
FIG. 6 is an electrical circuit diagram showing a module regulating drain switch, the filtering and power distribution path from the associated power supply.

The electrical circuit of the digitally programmable regulating drain switch and its external connections to a source of power to a load and to appropriate control signals are illustrated in FIG. 6.

Each regulating drain switch has three power terminals P1, P2, and P3. The first terminal (P1) is for connecting the drain switch to a remote power supply. More particularly, the terminal (P1) is connected via the laminated bus bar (3) to the positive terminal of the large storage capacitor (5) and the 1 KW power supply. The laminated bus bar (3) is illustrated as consisting of a series inductance shunted by a resistance, the combination being connected in series with a second resistance. The quantities, as will be explained, become of practical significance when the power is transferred in pulses having rapid rise times and short durations. The second power terminal (P2) is the output terminal for connecting the regulating drain switch to the associated MMIC T/R module load (32). The lead inductance between the regulating drain switch and the MMIC module is illustrated at 12. The lead inductance becomes significant when energy is supplied in short pulses. Should the regulating drain switch be allowed to turn on or turn off with a rapid rise or fall time, the inductance causes ringing in the load. The third power terminal (P3) is the ground return to which both the supply and the load are returned.

The control signals applied to the regulating drain switch are introduced via the thirty-one pads (36) on the substrate (34) (FIG. 4). As seen in FIG. 6, the controls include the transmitter enable control which turns the regulating drain switch on and off as each pulse is transmitted, the calibrate control used to establish and increment the reference voltage and "other corrections" which may be used to correct for module to module variations or for other purposes.

The circuit of the digitally programmable regulating drain switch (37) is illustrated in FIG. 6. The principal components include a temperature compensated voltage reference (10), a digital to analog converter (DAC) and RAM (11), a two-stage gating buffer (T2, T3), an operational amplifier (OPAMP) (13), a discrete power MOS transistor (T1), capacitors C1 to C3 and resistors R1 to R6.

The nature of the foregoing components and their connections are as follows. The temperature compensated voltage reference (10) is connected via a voltage dropping resistor (R6) to the 12 volt internal drain supply bus (14) and to the internal ground connection of the drain switch. The value of the resistor (R6) is selected to optimize regulator performance. The temperature compensated voltage reference may be a temperature compensated Zener reference or a band gap regulator, which tends to be inherently temperature stable. The quality of temperature compensation should be sufficiently high to maintain the output voltage within a millivolt of the nominal five to seven volt Zener value through the expected range of temperature variation. The temperature is affected by both ambient temperature and the dynamic temperature equilibrium within the equipment arrived at between the heating caused by dissipation in the electronics and the air cooling. Typically, the temperature compensation range should be through 100 degrees C.

The output of the voltage regulator 10 is coupled to the signal input of the DAC and RAM (11). The element (11), in the example, is one-quarter of an integrated circuit type AD 7225 having both a D to A conversion feature and memory storage. Typically the D to A converter has eight bits of resolution permitting one to increment or decrement the input signal fed to the RAM in 256 parts. The output signal of the member (11), replicates the voltage reference, plus or minus increments of this size as a function of the calibration and correction controls.

The output of the DAC and RAM (11) is coupled via a two-stage, temperature stable, gated buffer which provides a desirably low impedance drive, to the input of the OPAMP (13). The gated buffer consists of an NPN transistor (T2) type 1904 in an emitter follower configuration forming the first stage of the buffer followed by a PNP transistor (T3) type 1906, also connected in an emitter follower configuration, forming the second stage of the buffer.

The buffer connections between the DAC and RAM (11) and the OPAMP (13) are as follows. The signal from the DAC and RAM (11) is coupled to the base of the transistor (T2). The collector of transistor (T2) is connected to the B+ bus and the emitter of transistor (T2) is connected through the 2K ohm bias resistor (R5) to the internal ground. The signal appearing at the emitter of (T2) is coupled to the base of (T3). The collector of transistor (T3) is returned to ground and the emitter of transistor (T3) is connected via a biasing and buffering resistor (R1) to the control input for the transmitter enable signal. The emitter of the buffer is then connected to the positive input of the OPAMP (13).

The use of the two NPN/PNP emitter follower buffer stages between the DAC and RAM (11) and the OPAMP (13) produces a temperature stable buffer of low driving impedance for the OPAMP. The temperature compensation follows from the fact that complimentary transistors are employed in the signal coupling path so that any temperature induced drift in the input junction voltage of the first transistor is substantially equal to and of opposite sign to that of the second transistor. Thus the two deliver a compensated output voltage to the input of the OPAMP. The emitter follower configuration produces a downward impedance transformation, which having taken place twice, produces a low final driving impedance for the operational amplifier (13). The resistor (R1) in the transmitter enable path to the OPAMP has a high value of 3.3K relative to the low impedance of the buffer output. The resistor (R1) accordingly provides both biasing for the output stage of the buffer and buffering action tending to reduce any noise on the transmitter enable control path that might appear at the OPAMP input.

The OPAMP (13), which is gated on or off by the transmit-enable control, compares the output across the MMIC load with the reference supplied from the DAC and RAM (11). It then adjusts the gain of the transistor switch (T1) connected between the dc bus and the MMIC load in a tight feedback loop to bring the voltage at the load into proportional correspondence with the reference voltage.

The connections to the negative input terminal of the OPAMP are as follows. The negative input terminal of the OPAMP (13) is connected to the connection between resistors R2 and R3 which together form a voltage divider connected between the pad (P2), to which the MMIC load (32) is connected, and ground. This connection supplies a voltage to the negative input terminal of the OPAMP which is equal to half the voltage appearing across the load. A 470 picofarad capacitor, which provides high frequency feedback, is coupled between the output of the OPAMP and the negative sense input terminal.

The output terminal of the OPAMP (13) is connected to the gate of transistor switch (T1) which controls the flow of current from the dc bus to the MMIC load, and thereby controls the voltage at the MMIC load. The connection is an ac connection made via a 0.1 microfarad coupling capacitor (C1). A 10K ohm resistor (R4), which is connected between the gate and source of transistor (T1) acts to discharge the coupling capacitor (C1) after a short time. The drain of the transistor (T1) is connected to the internal B+ bus (14) and to the positive terminal of a moderately sized filter capacitor (C3) located in proximity to the T/R sub-assembly, the negative terminal of which is connected to the internal ground. The capacitor (C3) is shared between two regulating drain switches so that the effective capacity is approximately one half the indicated value. The capacitor size is dependent on its internal series resistance so that with a smaller series resistance, a smaller value, e.g. 25 microfarads may be adequate. The drain of the transistor (T1) is also connected to the pad (P1) for connection via the laminated bus bar (3) to the remote 1 KW power supply (4) and the remote large filter capacitor (5). The source of the transistor (T1) is connected to the pad (P2) to complete the current path from the dc bus (14) to the MMIC load (32).

The transistor (T1) is an N-channel 50 volt power MOSFET which has just recently become available.

The characteristic in which the transistor has been particularly improved is in relation to the resistance drain to source (Rds (on)), which for currents on the order of 5 amperes is less than 0.1 ohms. In the present application, the voltage drop allocable to the regulator is approximately 0.2 of a volt at 5 amps, which reduces the dissipation in the regulator circuit if less "head romm" is employed in the power supply. At the same time, the input capacitance of the device has been held to very low values, being typically less than 1000 picofarads. The result is that the bandwidth of the device, viewed as an amplifier, can be several megaHertz. The device is therefore fast enough to compensate for power supply variations occurring at the high rates required to turn on or turn off the pulse or for time to time variations within the pulse of the pulsed power amplifiers of a radar system.

The transistor, nominally a "linear device" when gated "on", may be gated on to a desired level of conductivity by a suitable setting of the bias and input signal levels. Due to the presenc of gain in the feedback loop, linearity is not required for the loop to stabilize and the device may be operated any w here in its active region. Thus, like other amplifiers, it may be used to provide a smoothly variable (if not linear) conductivity as required to provide a regulating switching action.

The choice of an N-MOS power transistor as the regulating drain switch as opposed to a P-MOS device provides several advantages, including lower cost. A disadvantage is that a voltage higher than the nominal B+ voltage is required to turn on the gate. Such a voltage however is easily obtained by using capacitor coupling from the OPAMP operating from +12 to −12 volts.

The regulating drain switch, whose circuit has just been described, provides a tight feedback loop connecting the OPAMP and the power MOS transistor which holds the output voltage of the power MOS transistor proportional to the reference voltage coupled to the positive terminal of the OPAMP. This relationship holds true so long as the loop gain is significantly above unity and the system's dynamic range is not exceeded. The 470 picofarad feedback capacitor limits the rise and fall time of the circuit to approximately 0.4 microseconds setting the upper limit in the response to the steep rise times appearing in high frequency transients. The purpose of this limit is to limit the voltage developed across the lead inductance (12) coupled to the individual T/R modules (32) to prevent ringing. The rise and fall time may accordingly be adjusted to the optimum value required to avoid ringing by selecting the correct size for the capacitor (C2) in the feedback loop.

Under normal operation which exists up until approximately one millisecond, the output voltage of the drain switch is directly proportional to the reference voltage. This assumes that the coupling capacitor (C1) has not yet discharged too much and that the loop gain continues to be significantly above unity. When the pulse width exceeds one millisecond, the voltage developed across the 0.1 microfarad coupling capacitor exceeds the reserve voltage dynamic range of the OPAMP causing the feedback loop to collapse. This in turn causes the output of the regulating drain switch to rapidly decay to zero.

Thus, the maximum on time of the drain switch is limited by the coupling capacitor (C1) and the gate source resistor (R4). AC coupling protects the MMIC load from being overheated and destroyed in the event of a hardware or software failure which would tend to keep the drain switch on for a longer period. This feature is particularly important where a small number of modules are incorrectly turned on and the peak demands thus created do not exceed the average current handling capability of the power supplies but may still cause overheating of individual module loads.

Figure 7:
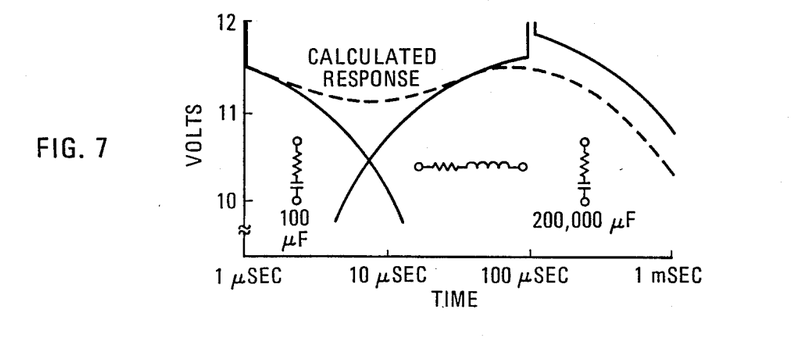
FIG. 7 is an illustration of the electrical performance of the power distribution network.

A primary advantage of the regulating drain switch is that it prevents the classical droop present in the transmitted pulse when the voltage, which is maintained by an energy storage capacitor, begins to fall. The regulating drain switch may be used with a conventional dc supply to offset variations at the load. FIG. 7 illustrates the voltage time profile of a novel supply, not a part of the present invention, from which the present regulating drain switch receives its energy during a pulse.

In this supply, whose elements are depicted generally in FIG. 6 and which include the laminated bus bar (3), the large filter capacitor (5) and the 1 KW power supply (4), several mechanisms operate to sustain the voltage at the T/R sub-assemblies during the 1 millisecond period envisioned as setting the outer limits of a transmitted pulse. During the first few microseconds, probably not over 10, the supply voltage is maintained by the local capacitor (C3) in the T/R sub-assembly, with an initial drop determined by the size of the series resistance of the capacitor. In the period from zero to 100 microseconds, the energy being supplied through the bus bar (3) from the large filter capacitors (5) is significantly modified by the series ac impedance of the bus bar consisting of inductance and resistance which vary during the conduction of high frequency energy. In the period between 100 microseconds and 1 millisecond the ac impedance of the bus bar is reduced to the dc value and the series resistance of the large capacitor now becomes significant. Granted that a voltage of $10.5 \pm \frac{1}{2}$ volt at the MMIC module load is desired, the present regulating drain switch will sustain the output voltage within the regulating accuracy of the drain switch over a transmitted pulse for a period in excess of 200 microseconds and approaching 1 millisecond.

Each regulating drain switch (37), including the local filter capacitor (C3) is placed proximate to the associated MMIC T/R module, and four such modules are placed in a common T/R sub-assembly. The four required regulating drain switches including the two local filter capacitors (C3) are subject to the size constraints imposed on the T/R sub-assembly as an entity. This size constraint has been met in the present embodiment. The laminated transmission line (3) and power supply elements (4) and (5) are remote and thus not subject to the constraints imposed on the individual T/R sub- assemblies. Together these elements provide the high performance required of a power supply system operating a phased array radar system. The drain switch of the present invention is, of course, not limited to use with a supply of this nature.

The present novel regulating drain switches are designed for a conventional phased array radar system in which the individual power amplifiers are turned on moments before a pulse from a master exciter is propagated to the power amplifiers. The power amplifiers should all be on throughout the radar system when the pulse arrives and all should turn off shortly after the pulse is over. The amount of anticipation or lag in the power amplifier switching should be adequate to allow the voltage to stabilize, but not significantly longer than the pulse duration, otherwise penalties in increased heat dissipation will be incurred. Where heat dissipation is of major concern, as in the present system, the ability to switch the power supplies on and off close to the limits of the actual pulse is particularly advantageous.

The present regulating drain switch provides the means to supply power from a dc distribution means to the pad of a solid state transmitting module or removing that power from the module under the command of a logic level signal. At the same time, the present regulating drain switch provides the means to make the dc voltage applied to the module, the function of an external control and essentially independent of the voltage on the distribution means. The regulating drain switch further makes it possible to provide flexibility in the time profile of the applied voltage. The output voltage may be made the function of a feedback capacitor for high frequency components over durations of fractional microseconds. It may be made the function of the setting of a digital to analog converter for medium frequency components over durations of microseconds to milliseconds. Finally, it may be made a function of a series blocking capacitor for the low frequency content of the logic level signal so as to withdraw power for circuit protection after a limited period and to prevent its application in a sustained fault.

The use of a regulating drain switch to sustain the voltage across a pulsed load for the duration of the pulse permits the saving of both space and bulk in the power supply at the T/R sub-assembly. The regulating drain switch herein proposed is easily fabricated in hybrid form creating neither a space problem—since the added electronics are small, nor adding heat dissipation—since the regulating function adds little additional heat over that of a switch and its circuit. A net saving in bulk is achieved since the regulating drain switch, as an active means of regulation, allows the same degree of voltage stabilization to be achieved with a smaller filter capacitor at the T/R subassembly. In a practical example, a three to one reduction in local capacity and thereby a significant saving in power supply volume and bulk is achieved.

What is claimed is:

1. A digitally controlled regulating switch for operating a pulsed transmitting module from a dc power supply, each module driving an individual antenna element in a phased array radar system, said regulating switch comprising,
   A. a first, power input terminal for connecting said regulating switch to said dc power supply
   B. a second, power output terminal for connecting said regulating switch to said power module,
   C. a third common power terminal for connecting said switch to said dc power supply and to said pulsed power module,
   D. a gated digital voltage reference of high temperature stability having a first output terminal, a second common terminal connected to said common power terminal, and a gating terminal
   E. a filter capacitor having a first and a second terminal, the first terminal being coupled to said first power input terminal and the second terminal being coupled to said common power terminal
   F. a high gain operational amplifier having a positive input terminal, a negative input terminal, and an output terminal
   G. means connecting the positive input terminal of said operational amplifier to the output terminal of said gated voltage reference
   H. means connecting the negative input terminal of said operational amplifier to said first power output terminal for sensing the voltage at said pulsed transmitting module,
   I. a feedback capacitor connected between the output terminal and negative input terminal of said operational amplifier for restricting the rise and fall times at said second power output terminal consistent with the desired regulation accuracy to remove unwanted output transients,
   J. a power, metal oxide semi-conductor field effect transistor (MOSFET) having gate, source, and drain electrodes, said transistor exhibiting a low drain to source electrode on-resistance for power efficiency and a low input capacitance to provide sufficient bandwidth for accurate response to variations having rise times comparable to the pulsing of said transmitting module, said drain electrode being coupled to said power input terminal, and said source electrode being coupled to said power output terminal,
   K. a coupling capacitor for ac coupling the output terminal of said operational amplifier to said gate electrode
   L. a coupling capacitor discharging resistor coupled between said gate electrode and said drain electrode to discharge said coupling capacitor,
   said coupling capacitor and said capacitor discharging resistor, completing a high gain ac coupled feedback loop by which the voltage at said pulsed transmitting module is brought into correspondence with said gated digital reference, the time constant of said feedback loop being set to exceed the maximum desired pulse duration, but short enough to protect said load against an improperly sustained control signal.

2. The arrangement set forth in claim 1 wherein
   (1) the polarity of power supplied to said first power input terminal is positive, and
   (2) said power MOSFET is of the N-channel type.

3. The arrangement set forth in claim 1 wherein
   (1) the bandwidth of said power metal oxide field effect transistor lies in the range of from 1 to 10 megaHertz, and
   (2) the value of said feedback capacitor is selected to reduce the rise times sufficiently to prevent ringing due to lead inductance in the transmitting module or the connections thereto.

4. The arrangement set forth in claim 1 wherein said gated digital voltage reference is programmable for remote control of the voltage output of said regulating drain switch, for independence of the load voltage from that of said dc power supply so long as a minimum dc supply voltage is maintained.

5. A physically compact digitally controlled regulating switch for operating a pulsed transmitting module from a dc power supply, each module driving an individual antenna element in a phased array radar system, said regulating switch comprising,
   A. a first, power input terminal for connecting said regulating drain switch to said dc power supply
   B. a second, power output terminal for connecting said regulating switch to said power module,
   C. a third common power terminal for connecting said switch to said dc power supply and to said pulsed power module,
   D. a gated digital voltage reference of high temperature stability having a first output terminal, a second common terminal connected to said common power terminal, and a gating terminal connected to a source of control signals setting the on times of said regulating switch for pulsed energization of said power module, E. a filter capacitor having a first and a second terminal, the first terminal being coupled to said first power input terminal and the second terminal being coupled to said common power terminal F. a high gain operational amplifier having a positive input terminal, a negative input terminal, and an output terminal G. means connecting the positive input terminal of said operational amplifier to the output terminal of said gated voltage reference H. means connecting the negative input terminal of said operational amplifier to said second power output terminal for sensing the voltage at said pulsed transmitting module, I. a power, metal oxide semi-conduct effect transistor (MOSFET) having gate, source, and drain electrodes, said transistor exhibiting a low drain to source electrode on-resistance for power efficiency and a low input capacitance to provide sufficient band width for accurate response to variations having rise times comparable to the pulsing of said transmitting module, said drain electrode being coupled to said power input terminal, and said source electrode being coupled to said power output terminal, J. means coupling the output terminal of said operational amplifier to said gate electrode to complete a high gain feedback loop by which the voltage at said pulsed transmitting module is brought into correspondence with said gated digital reference, said regulating feedback loop reducing the requirement for filter capacity and bulk at said module to achieve voltage stabilization during pulse transmission.

6. The arrangement set forth in claim 5 wherein said means (J) comprises (1) a coupling capacitor for ac coupling the output terminal of said operational amplifier to said gate electrode, and (2) a resistor for discharging said coupling capacitor coupled between said gate electrode and said drain electrode at a desired discharge rate to limit the maximum "on" time of said switch.

7. The arrangement set forth in claim 6 wherein a feedback capacitor is provided connected between the output terminal and negative input terminal of said operational amplifier for restricting the rise and fall times at said second power output terminal consistent with the desired regulation accuracy to remove unwanted output transients.

* * * * *